Sept. 29, 1953

C. E. LOMAX 2,654,001

SEQUENCE SWITCH CIRCUIT

Filed Jan. 18, 1952

2 Sheets-Sheet 1

INVENTOR.
CLARENCE E. LOMAX

BY Wm. Walter Owen.

ATTY.

Sept. 29, 1953

C. E. LOMAX 2,654,001

SEQUENCE SWITCH CIRCUIT

Filed Jan. 18, 1952

2 Sheets-Sheet 2

INVENTOR.
CLARENCE E. LOMAX
BY Wm. Walter Owen.
ATTY.

Patented Sept. 29, 1953

2,654,001

UNITED STATES PATENT OFFICE 2,654,001

SEQUENCE SWITCH CIRCUIT

Clarence E. Lomax, Chicago, Ill., assignor to Automatic Electric Laboratories, Inc., Chicago, Ill., a corporation of Delaware Application January 18, 1952, Serial No. 267,121

4 Claims. (Cl. 179—18)

This invention relates in general to telephone systems and more particularly to telephone switching circuits utilizing sequence switches.

One object of this invention is to provide a telephone switching circuit which employs a sequence switch to first perform certain necessary circuit switching operations in place of relays and which then doubles as a selecting switch for use in automatic selection responsive to digital impulses.

Another object of this invention is to provide a telephone circuit comprising a selecting switch and a sequence switch in which the selecting switch is caused to operate under control of the sequence switch to select a pair of outlets responsive to a pair of series of impulses and in which the sequence switch then doubles as a second selecting switch and is caused to step to select one or the other of the pair of outlets responsive to one or the other of two certain series of impulses, and in which a means is provided for preventing the sequence switch from stepping to its home position should the series include more impulses than necessary to select said one or the other outlet.

Still another object is to provide that if, in conjunction with the immediately preceding object, one or the other of the two certain series of impulses is received, the designated outlet will be seized but if more than the required number of impulses is received, neither outlet will be seized.

Another object of this invention is the provision of a telephone switching circuit in which a sequence switch is first used as a sequence switch in place of relays and is then converted to use as a selecting switch in selecting between one or the other of two outlets, previously selected by another selecting switch, in response to a series of impulses composed of one or the other of two certain numbers of impulses, either of said outlets being selected by the sequence switch if the series is composed of any number of impulses except said two certain numbers.

The invention will appear more clearly, and further objects will become apparent, from the following detailed description when taken in connection with the accompanying drawings showing, by way of example, a preferred embodiment of the inventive idea.

Figure 1:
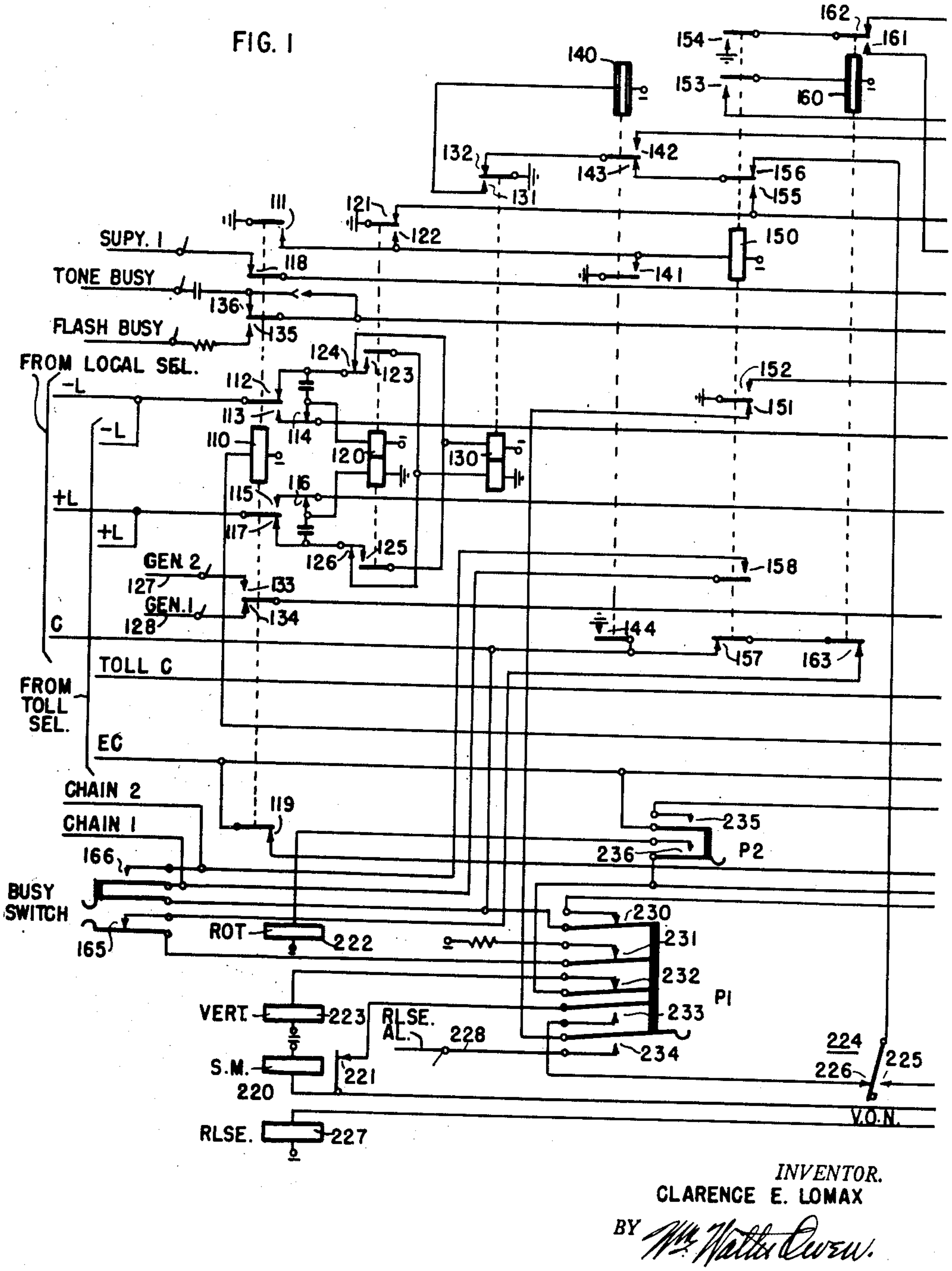
Figures 2, 3, 4:
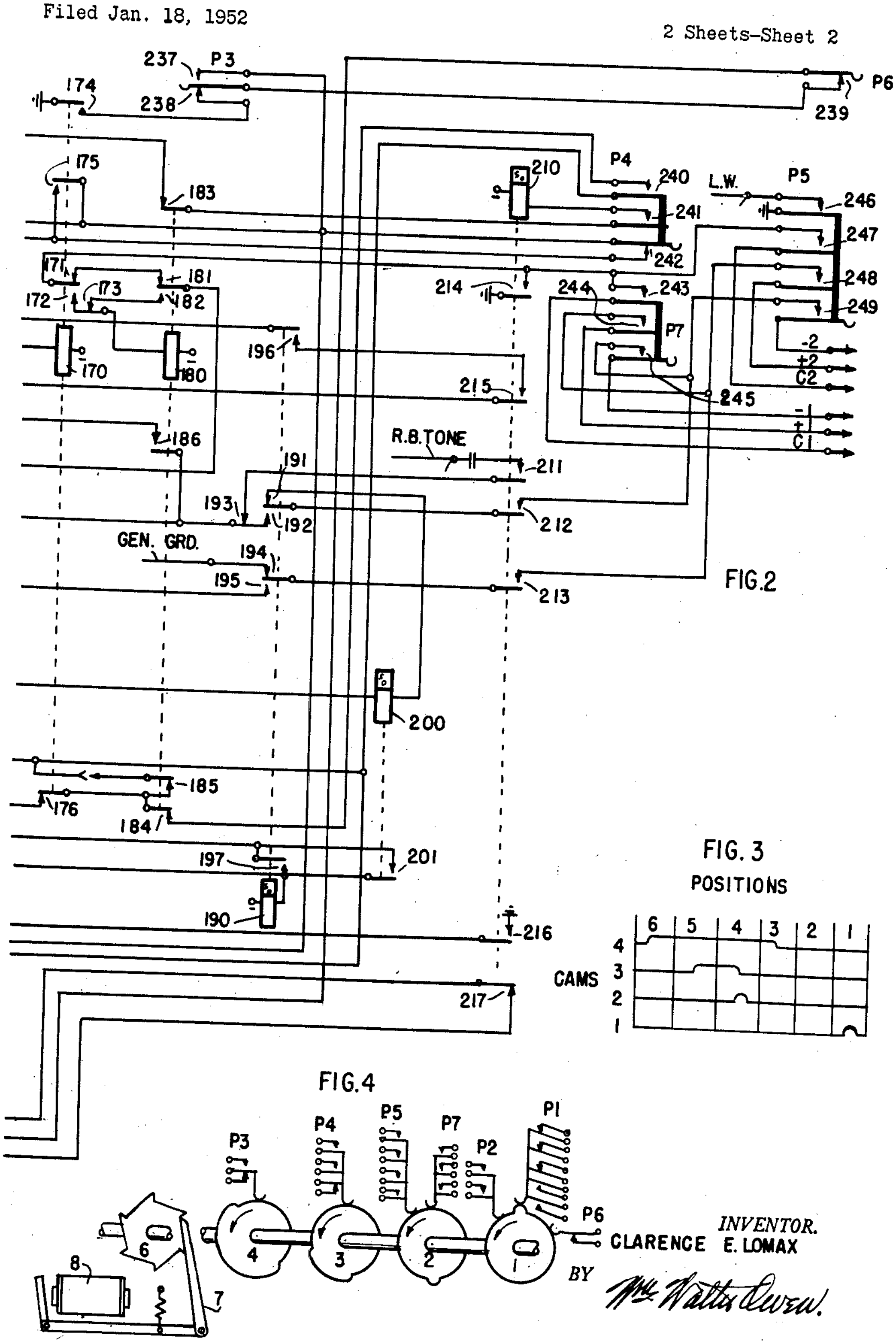

Figs. 1 and 2 show a combination local and toll connector circuit for use in establishing a telephone connection from a local subscriber or toll operator, the circuit including contacts on spring pile-ups P1 to P6, inclusive, of the sequence switch shown in Fig. 4.

Fig. 3 shows the cams of the squence switch in a graphical form. A combination local and toll connector using a sequence switch which doubles as a code selector is shown in an application of C. E. Lomax entitled "Combination Toll and Local Party Line Connector Using a Sequence Switch" Serial No. 206,375 filed January 17, 1951.

Referring first to Fig. 4, the sequence switch shown therein is of the step-by-step pawl driven type, the cams 1 to 4, inclusive, which comprise the switch being fixedly secured on a common shaft to which there is also fixedly attached a ratchet 6 designed to cause the shaft and thus the cams to take six steps to complete one revolution. The ratchet 6 is driven by a pawl 7 controlled by an electromagnet 8, the switch being of the reverse drive type, i. e., the switch will trigger itself on the operation of the magnet and will step on the release of the magnet. There are four cams in the sequence switch shown, the cams being labelled one to four, inclusive, and associated with each cam is one or more spring pile-ups, each pile-up consisting of one or more pairs of springs. The sequence switch has a normal or home position which it assumes when the connector is not in use, the switch in Fig. 4 being shown in the home position. Besides the home or number one position, the switch has five other positions making a total of six. Certain ones of the spring pile-ups are operated in each position of the sequence switch. For instance, spring pile-up P1 is operated by cam 1 and its contact sets moved to their off-normal position when the sequence switch is in the normal position while pile-up P2 is operated by the same cam in position 2.

I will first describe the operation of this circuit in making a call from a local subscriber and then the operation in establishing a connection from a toll operator.

*Local call*

This connector circuit is accessible to battery searching selectors in both local and toll switchtrains. This circuit is marked idle to the battery searching local selector by the presence of resistance battery on the C lead by way of contacts 231 of spring pile-up P1, contacts 165, 163, and 157. The searching selector on locating this idle connector forwards ground over the C lead to mark this circuit as busy on the local selector banks and also to ground the Toll C lead by way of contacts 230 of spring pile-up P1, marking this connector as busy on the toll selector banks. The incoming line loop is closed through to relay 130 by way of contacts 112, 124, 117 and 126. Relay 130 operates and closes relay 140 at contacts 131. Relay 140 operates, closes relay 150 at contacts 141, grounds the C lead at contacts 144 to hold the preceding switch train under control of this connector and to hold this connector marked busy on the C and Toll C leads, and prepares the pulsing circuit to the Strowger switch vertical magnet 223 at contacts 142. Relay 150 operates, prepares the circuit to relay 160 at contacts 153, removes resistance battery from the control leads C and Toll C at contacts 157 and closes a part of the all-trunks-busy chain at contacts 158.

This circuit is now ready to receive the first series of impulses representing the first of the last three digits of the called party's number. Relay 130 follows the impulses over the line and repeats these impulses to the vertical magnet 223 by way of contacts 132, 142, 242 of spring pile-up P4 and 232 of spring pile-up P1. On the first release of relay 130, a circuit is closed by way of contacts 132, 142, 242 of spring pile-up P4 and 153 to relay 160. Relay 160 operates and closes the circuit to relay 170 at contacts 161. Both relays 140 and 160 remain operated during the series of impulses due to their slow release characteristics. Relay 170 operates, closes a circuit to the sequence switch magnet 220 by way of contacts 174, 238 of spring pile-up P3 and 239 of spring pile-up P6, closes a circuit at contacts 175 to by-pass contacts 242 of spring pile-up P4 (this operation serving no purpose at this time) and prepares the circuit to relay 180 at contacts 172. The vertical magnet 223 follows the pulses to step the Strowger switch wipers to the desired bank level. On the first step of the Strowger switch in the vertical direction, the vertical off-normal (V. O. N.) springs 224 operate. The sequence switch magnet 220 operates from relay 170 but the sequence switch is so designed that it steps only on the release of the sequence switch magnet and therefore does not step at this time. After the termination of the first series of impulses, relay 130 remains steadily operated, opening the circuit to relay 160. After a short delay, relay 160 restores and opens the circuit to relay 170 at contacts 161. Relay 170 restores, opening the circuit to the sequence switch magnet 220 at contacts 174. The magnet 220 restores and steps the sequence switch from position 1 to position 2 at which time spring pile-up P1 returns to normal and pile-up P2 is operated. Spring pile-up P1, in its normal position, opens the pulsing circuit to the vertical magnet 223 at contacts 232, opens the circuit to the resistance battery at contacts 231, and disconnects the C lead from the Toll C lead at contacts 230, this connector still being held marked busy to the toll selectors by absence of battery on the Toll C lead. Operation of spring pile-up P2 closes the pulsing circuit to the Strowger switch rotary magnet 222 at contacts 236 and connects relay 190 to the EC lead at contacts 235 for a purpose to be later described in connection with a toll call.

This circuit is now ready to receive the second series of impulses. Relay 130 again follows the impulses and again closes the circuit to relay 160, this time repeating the impulses to the rotary magnet 222 by way of contacts 236 of spring pile-up P2. Relay 160 operates and closes relay 170 by way of contacts 161. Relay 170 operates, closing contacts 175 to by-pass contacts 242 of spring pile-up P4 and closing the sequence switch magnet 220 at contacts 174. The rotary magnet 222 follows the impulses in the second digit and steps the Strowger switch wipers across the banks of outlet contacts to cause one set of wipers to select a line, corresponding to the two digits received, in the first hundreds group of lines and to cause the second set of wipers to select a line in the second hundreds group of lines corresponding to the same two digits. Neither line is tested for busy or seized at termination of the second digit, a third digit being needed to determine which of the two selected lines is desired. After termination of the second series of impulses, relay 130 remains steadily operated, opening the circuit to relay 160 at contacts 132. Relay 160 restores and opens relay 170. Relay 170 restores and opens the sequence switch magnet 220 at contacts 174. The sequence switch magnet 220 restores and steps the sequence switch from the second position to the third position at which time spring pile-up P2 restores and pile-up P3 operates. Restoration of spring pile-up P2 opens the circuit to the rotary magnet 222 at contacts 236. Operation of spring pile-up P3 transfers the sequence switch magnet 220 from control of relay 170 by way of contacts 238 to control of the pulsing circuit by way of contacts 237.

The circuit is now ready for receipt of the third digit, this third digit consisting of one or two pulses to select the hundreds group in which the desired called line is located. Relay 130 follows the third series of impulses, closing relay 160 and the sequence switch magnet 220 on the first pulse. Relay 160 operates and closes relay 170. Relay 170 operates and closes a by-pass circuit around contacts 242 to the sequence switch magnet 220 at contacts 175 to keep the pulsing circuit to the sequence switch magnet 220 closed when spring pile-up P4 operates. The sequence switch magnet 220 operates and releases in response to the first impulse, causing the sequence switch to step from the third to the fourth position at which time spring pile-ups P4 and P7 operate. Operation of spring pile-up P4 prepares the circuit to relay 210 at contacts 241 and opens the point in the original pulsing circuit to the sequence switch magnet at contacts 242. Operation of spring pile-up P7 connects the busy relay 180 to the C1 wiper at contacts 243 and closes the first hundreds group line wiper leads at contacts 244 and 245. If the line in the first hundreds group is the line desired, there is only one impulse in the third digit and the sequence switch takes only the one additional step, holding P7 operated along with pile-ups P3 and P4. Assuming only the one impulse is received, after a short delay relay 160 releases and opens a further point in relay 170. Relay 170 releases and opens the pulsing circuit to relay 160 and to the sequence switch magnet 220 at contacts 175 so that further pulsing of relay 130 cannot cause relay 160 and the sequence switch magnet 220 to operate.

If the called line in the first hundreds group is busy, relay 180 is operated from direct ground on the C1 wiper as soon as spring pile-up P7 operated, and before relay 170 has time to release, by way of contacts 243 and 172. Relay 180 closes a holding circuit to itself at contacts 182 so that when relay 170 releases, relay 180 locks up by way of contacts 173, 182 and 152. Relay 180 opens the circuit to relay 210 at contacts 183 to prevent operation of relay 210 and closes busy tone to the calling party by way of contacts 136, 186, 114 and 112. The pulsing circuit is open at contacts 175 and 242 so that further dialling cannot affect the switches. After the calling party hears the busy tone and releases, relay 130 restores and opens relay 140. Relay 140 restores, opens relay 150 at contacts 141, and removes ground from the C lead at contacts 144 to release the preceding switchtrain. Relay 150 releases, opens relay 180 at contacts 152, closes the release alarm lead 228 at contacts 151, closes the release magnet 227 by way of contacts 132, 143, 156, V. O. N. contacts 225 and contacts 217, and opens the all trunks busy chain at contacts 158. Relay 180 releases to open the busy tone circuit at contacts 185. Release magnet 227 operates to return the Strowger switch to normal. When the Strowger switch is at normal, the V. O. N. springs 224 return to normal, opening the release magnet 227 at contacts 225 and closing a self-stepping circuit to the sequence switch magnet 220 by way of contacts 132, 143, 156, 226, 233 of pile-up P1 and 221. The sequence switch magnet 220 operates in a self-interrupting manner to step the sequence switch to its home position at which time spring pile-up P1 moves off normal to open contacts 233 to thereby stop the stepping of the sequence switch. Spring pile-up P1 also closes battery to the C and Toll C leads to render this circuit idle to hunting selectors and opens the alarm lead at contacts 234. If the Strowger switch or the sequence switch had not returned to normal within a certain time period, the grounded release alarm lead would have caused the sending of an alarm to indicate this condition.

If the called line in the first hundreds group is idle, then battery will be standing on the C1 wiper through the BCO relay in the line circuit (not shown) and relay 180 will not operate. When relay 160 releases, it opens the circuit to relay 170 at contacts 161 and closes the circuit to relay 210 by way of contacts 154, 162, 183 and 241 of spring pile-up P4. Relay 170 restores and closes ground to the C1 wiper at contacts 171 and by way of contacts 243 of pile-up P7 to operate the BCO relay to thereby seize the called line circuit and also to busy the called line to other connectors. Relay 210 operates, opens a point in the release circuit at contacts 217, closes ring-back tone to the calling party by way of contacts 211, 193, 114 and 112, closes the ringing circuit through relay 200 and over the called line by way of Gen. 1 lead 128, contacts 134, 191, 212, 245 of spring pile-up P7, 244 of spring pile-up P7, 213 and 194, and closes a multiple holding circuit to the C1 wiper at contacts 214. When the called party answers, the called line loop is closed to operate relay 200. Operation of relay 200 closes the circuit to relay 190 by way of contacts 216, 119 and 201. Relay 190 operates, switches the outgoing line through at contacts 192 and 195 to relay 120, locks up to relay 210 by way of contacts 216, 119 and 197, and opens relay 200 at contacts 191 and 194. Relay 200 releases. Relay 120 operates, closes a multiple holding circuit to relay 150 at contacts 122 and reverses battery back on the calling line at contacts 123 and 125 for supervision.

This connector is held under control of the last party to release. If the called party releases first, relay 120 releases and closes ground to the Supy 1 lead by way of contacts 121, 196, 215 and 118 to indicate that one party has released and that the other party is holding the switch train. When the calling party releases, relay 130 releases and opens relay 140 at contacts 131. Relay 140 releases, opens relay 150 at contacts 141 and removes ground from the C lead at contacts 144 to release the preceding switchtrain, the connector still being held busy by an absence of battery on the C and Toll C leads. Relay 150 releases and opens relay 210 which also releases. Release of relay 150 causes the switch circuit to function as previously described to return the Strowger switch and sequence switch to normal. If the calling party released first, the release operation would be much the same as when the called party released with the difference that when relay 140 restored it would remove ground from the C lead to cause the preceding switchtrain to be released immediately, even though this connector would still be held by the called party.

Now assume that the line in the second hundreds group is the line desired. The third digit would be composed of 2 impulses and the sequence switch would take two steps in response to these two impulses. Spring pile-up P7 would be restored to normal and spring pile-up P5 would be caused to operate when the sequence switch stepped from the fourth to the fifth position in response to the second impulse. Spring pile-ups P3 and P4 remain in the off-normal position. Operation of spring pile-up P5 causes the line in the second hundreds group to be tested for busy, seized if idle and rung over the +2, −2, and C2 wipers in the same manner as explained for the line in the first hundreds group on termination of the third digit. Subsequent operation of the circuit when the line in the second hundreds group is found busy or when a talking connection is established therewith, is similar to that described previously in connection with the line in the first hundreds group.

The third digit received by the connector should be composed of one or two impulses to select one of the two lines, but if a mistake should be made in dialing and more than two impulses are received, neither line will be seized and also the sequence switch will not be allowed to step to its home position in response to the extra impulses. This operation will now be described. As previously explained, if the third digit is composed of one impulse, spring pile-up P7 will be moved off-normal to cause the selected line in the first hundreds group to be seized and, if the third digit is composed of two impulses, spring pile-up P7 would be returned to normal and pile-up P5 will be moved off-normal to cause the selected line in the second hundreds group of lines to be seized. Now if the third digit is composed of three or more impulses, the sequence switch magnet 220 will operate a third time and will cause the sequence switch to step from the fifth position to the sixth position, in which position spring pile-ups P5 and P4 are returned to normal and pile-up P6 is moved off-normal. Pile-up P4 is made to restore so that if a toll call is being made, the toll switching relay 110 will not operate when relay 170 restores. Operation of spring pile-up P6 opens the pulsing circuit to the sequence switch magnet 220 at contacts 239 so that if there are more than three impulses in the third digit, the sequence switch would not step to its home position and close the pulsing circuit to the Strowger switch vertical magnet. Further impulsing will not affect this circuit. A second pair of contacts could be provided in spring pile-up P6 to give a busy signal to the calling party should the wrong third digit be dialed. This connector circuit will return to normal when the calling party hangs up as previously described.

*Toll service*

This connector circuit is marked idle to the searching toll selectors by the resistance battery on the Toll C lead thru contacts 231 of spring pile-up P1. This connector is seized in the same manner as for a local call, relays 130, 140, and 150 operating. Pulses from the first digit elevate the Strowger switch shaft and control the sequence switch the same as for local calls. When the first digit is terminated however, operation of spring pile-up P2 closes relay 190 to the E. C. (extra control) lead by way of contacts 235. Ground forwarded over the E. C. lead by the toll switch train causes operation of relay 190. Operation of relay 190 is for the purpose of placing control of ringing in the hands of the toll operator. Relay 190 locks up to the E. C. lead at contacts 197.

Dialing of the second and third digit causes this circuit to respond in the same manner as for a local call to select a line in one of the hundreds groups of lines. When the sequence switch steps to the third position, spring pile-up P2 opens the operating circuit to relay 190 but relay 190 is locked to the E. C. lead.

First let us assume that the selected line is busy. Arrangements are shown for giving the toll operator tone busy or flash busy or both tone and flash busy. If tone busy only is desired, the R and Z wires are omitted. In this case then, should the called line be busy, relay 180 would operate and would close busy tone by way of contacts 136 to the toll line as it did for a call from a local subscriber. If flash busy only is desired, the Z wire is connected and the R wire omitted. In this case, when relay 180 operates it closes the ground standing on the Toll C lead to relay 110 by ways of contacts 185. Relay 110 operates and, at contacts 136 and 135, disconnects tone busy and connects flash busy to the toll line. If a combination of tone busy and flash busy is desired, then both the R and Z wires are connected. Flash busy signals would be applied to the toll line by ways of contacts 135 and tone busy by way of the R wire, the busy interrupter being so made that it will apply tone busy during the period flash busy is not being applied.

If the called line is idle, this circuit will operate much the same as for a local call but in addition, release of relay 170 will close relay 110 to the E. C. lead. Ground standing on the E. C. lead will cause relay 110 to operate. Operation of relay 110 closes a multiple holding circuit to relay 150 at contacts 111, switches the incoming toll line directly through the connector at contacts 113 and 115, opening relay 130, opens a point in the Supy lead at contacts 118, open contacts 119 to keep relay 190 from holding operated from ground at contacts 216, and transfers the ringing circuit from the Gen. 1 lead 128 to the Gen. 2 lead 127. A special ringing signal is connected to Gen. 2 such as a code to indicate to the called party that this particular call is a toll call. This should result in a quicker response to the call by the called party. Both relays 130 and 140 restore.

This circuit is arranged to give delayed ringing, relay 190 being held operated over the E. C. lead and in turn holding the ringing circuit open. Delayed ringing is wanted by some operators and not by others, and the releasing of relay 190 may be under the control of the operator's ringing key or it may be the toll transmission repeater doing it automatically. In either case, relay 190 is released by momentarily removing ground from the E. C. lead. Relay 190 restores to close the ringing circuit to the called line and opens, at contacts 197, its locking circuit to the E. C. lead so that relay 190 cannot operate from the E. C. lead when ground is reconnected thereto. As previously stated, relay 200 operates when the called party answers and closes relay 190 at contacts 201. Relay 190 operates, again locks up to the E. C. lead, and switches the called line through this circuit to the toll transmission repeater (not shown) where transmission battery is supplied.

If the call is to a subscriber, the operator can re-ring at any time after the called party hangs up. This is done by again momentarily removing ground from the E. C. lead to cause relay 190 to restore.

When the toll operator releases after the called party hangs up, relay 110 restores and opens relay 150 which restores as previously explained to cause the Strowger and sequence switches to return to normal.

This invention is not limited to the specific embodiment shown nor to connectors in general but applies equally well to similarly functioning switches circuits. Numerous uses and adaptations of this invention will occur to those versed in the art and all changes and modifications coming within the scope of the appended claims are embraced thereby.

What is claimed is:

1. In a connector switch circuit, a primary magnet and a secondary magnet for driving said connector switch, a sequence switch including a magnet therefor, a pulsing circuit for transmitting series of impulses, circuit means connecting said pulsing circuit to said primary magnet, a second circuit means for connecting said pulsing circuit to said secondary magnet, a third circuit means for connecting said pulsing circuit to said sequence switch magnet, means associated with said pulsing circuit for operating said sequence switch after transmission of each of a first and second series of impulses, a first means operated by said sequence switch after transmission of a first series of impulses for disabling said first circuit means and for operating said second circuit means, a second means operated by said sequence switch after transmission of a second series of impulses for disabling said second circuit means and for operating said third circuit means, and a third means operated by said sequence switch during transmission of a third series of impulses for disabling said third circuit means.

2. In a connector switch circuit, a primary magnet and a secondary magnet for driving said connector switch, a plurality of sets of wipers driven by said connector switch, a talking circuit in said connector circuit, a sequence switch including a magnet therefor, a pulsing circuit for transmitting series of impulses, circuit means connecting said pulsing circuit to said primary magnet, a second circuit means for connecting said pulsing circuit to said secondary magnet, a third circuit means for connecting said pulsing circuit to said sequence switch magnet, means associated with said pulsing circuit for operating said sequence switch after transmission of each of a first and second series of impulses, a first means operated by said sequence switch after transmission of a first series of impulses for disabling said first circuit means and for operating said second circuit means, a second means operated by said sequence switch after transmission of a second series of impulses for disabling said second circuit means and for operating said third circuit means, a third means operated by said sequence switch responsive to receipt thereby of a first impulse in a third series of impulses for connecting said talking circuit to one of said wiper sets, a fourth means operated by said sequence switch responsive to receipt thereby of a second impulse in said third series of impulses for connecting said talking circuit to another of said wiper sets, and a fifth means operated by said sequence switch responsive to receipt thereby of a third impulse in said third series of impulses for disabling said pulsing circuit.

3. In a connector circuit of the class wherein a primary magnet and a secondary magnet are successively responsive to first and second series of impulses received over a pulsing circuit to step the connector switch in primary and secondary directions to first select two groups of outlets and to then select one outlet in each group and wherein a sequence switch including a magnet therefor is first operated as a sequence switch after the first series of impulses to transfer the pulsing circuit from the primary magnet to the secondary magnet and again after the second series of impulses to transfer the pulsing circuit from the secondary magnet to the sequence switch magnet and wherein the sequence switch is then operated as a selecting switch responsive to a third series of impulses received over the pulsing circuit to select one of the two selected outlets dependent on the number of impulses in the third series, the improvement comprising a first set of contacts for connecting, when operated, one of said selected outlets through said connector circuit, a second set of contacts for connecting, when operated, the other of said outlets through said connector circuit, a third set of contacts for disabling, when operated, said pulsing circuit, circuit means for operating said sequence switch magnet for each impulse of said third series received over said pulsing circuit, and means controlled by said sequence switch for operating said first set of contacts in response to the receipt of said third series only in case said third series comprises a predetermined number of impulses and for operating said second set of contacts only in response to the receipt of said third series in case said third series comprises a different predetermined number of impulses and for operating said third set of contacts only on receipt of said third series in case said third series comprises a still different number of impulses.

4. In a connector switch circuit, a primary magnet and a secondary magnet for driving said connector switch, a plurality of sets of wipers driven by said connector switch, a talking circuit in said connector circuit, a sequence switch including a magnet therefor, a pulsing circuit for transmitting series of impulses, circuit means connecting said pulsing circuit to said primary magnet, a second circuit means for connecting said pulsing circuit to said secondary magnet, a third circuit means for connecting said pulsing circuit to said sequence switch magnet, means associated with said pulsing circuit for operating said sequence switch after transmission of each of a first and second series of impulses, a first means operated by said sequence switch after transmission of a first series of impulses for disabling said first circuit means and for operating said second circuit means, a second means operated by said sequence switch after transmission of a second series of impulses for disabling said second circuit means and for operating said third circuit means, a third means operated by said sequence switch responsive to receipt thereby of a first impulse in a third series of impulses for connecting said talking circuit to one of said wiper sets, a fourth means operated by said sequence switch responsive to receipt thereby of a second impulse in said third series of impulses for transferring said talking circuit from said one wiper set to another wiper set, and a fifth means operated by said sequence switch responsive to receipt thereby of subsequent impulses for disconnecting said talking circuit from said other wiper set.

CLARENCE E. LOMAX.

No references cited